(12) United States Patent
Tokuyama et al.

(10) Patent No.: US 6,728,425 B1
(45) Date of Patent: Apr. 27, 2004

(54) IMAGE PROCESSING DEVICE

(75) Inventors: Mitsuru Tokuyama, Soraku-gun (JP); Masatsugu Nakamura, Kashiba (JP); Mihoko Tanimura, Nara (JP); Norihide Yasuoka, Yamatokoriyama (JP); Masaaki Ohtsuki, Yamatokoriyama (JP); Hirohumi Sakita, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 734 days.

(21) Appl. No.: 09/584,517

(22) Filed: May 31, 2000

(30) Foreign Application Priority Data

May 31, 1999 (JP) .......................................... 11-152226

(51) Int. Cl.[7] .......................... G06K 9/32; G06F 15/00
(52) U.S. Cl. ........................ 382/299; 382/173; 358/1.2
(58) Field of Search ............................... 382/173, 258, 382/260–275, 276, 298, 299, 300, 312; 358/1.2, 2.1, 296, 474, 486, 497, 496, 525, 528

(56) References Cited

U.S. PATENT DOCUMENTS

| | | | | |
|---|---|---|---|---|
| 4,969,051 A | * | 11/1990 | Sasaki | 358/447 |
| 5,177,626 A | * | 1/1993 | Nosaki et al. | 358/486 |
| 5,410,615 A | * | 4/1995 | Mailloux | 382/299 |
| 5,483,359 A | * | 1/1996 | Yumiba et al. | 358/513 |
| 5,659,402 A | * | 8/1997 | Fujita et al. | 358/2.1 |
| 5,687,008 A | * | 11/1997 | Morikawa et al. | 358/475 |
| 6,002,429 A | * | 12/1999 | Ochi et al. | 348/220.1 |
| 6,111,982 A | * | 8/2000 | Adachi | 382/176 |
| 6,240,206 B1 | * | 5/2001 | Tokuyama et al. | 382/176 |
| 6,324,309 B1 | * | 11/2001 | Tokuyama et al. | 382/300 |
| 6,388,777 B1 | * | 5/2002 | Miyajima | 358/486 |

FOREIGN PATENT DOCUMENTS

| | | |
|---|---|---|
| EP | 0 785 529 A1 | 7/1997 |
| EP | 0 902 585 A2 | 3/1999 |
| JP | 5-114996 | 5/1993 |

OTHER PUBLICATIONS

European Search Report dated Nov. 21, 2002.

\* cited by examiner

*Primary Examiner*—Bhavesh M. Mehta
*Assistant Examiner*—Kanji Patel
(74) *Attorney, Agent, or Firm*—Edwards & Angell, LLP; David G. Conlin; George W. Hartnell, III

(57) ABSTRACT

An image processing device of the present invention includes a region separating section and a filter processing section. With respect to a picture signal which is read out after resolution thereof in a sub scanning direction has been converted, the region separating section computes maximum density difference and complexity as feature parameters indicative of a characteristic of each pixel in the picture signal. Additionally, with respect to the complexity which is dependent on a size of the resolution in the sub scanning direction, the region separating section carries out a correction in accordance with the size of the resolution in the sub scanning direction, and separates the picture signal into each region by using the maximum density difference and the corrected complexity. In accordance with the size of the resolution in the sub scanning direction and each region separated by the region separating section, the filter processing section performs suitable image processing of the picture signal.

19 Claims, 12 Drawing Sheets

FIG.7(a)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG.7(b)

| 1 | 1 | 1 | 1 | 1 |
|---|---|---|---|---|
| 1 | 1 | 1 | 1 | 1 |
| 1 | 1 | 48 | 1 | 1 |
| 1 | 1 | 1 | 1 | 1 |
| 1 | 1 | 1 | 1 | 1 |

FIG.7(c)

| 1 | 1 | 1 | 1 | 1 |
|---|---|---|---|---|
| 1 | 2 | 2 | 2 | 1 |
| 1 | 2 | 48 | 2 | 1 |
| 1 | 2 | 2 | 2 | 1 |
| 1 | 1 | 1 | 1 | 1 |

FIG.8(a)

| 0 | 0 | 0 | 0 | 0 |
|---|---|---|---|---|
| 0 | 0 | 0 | 0 | 0 |
| 0 | 0 | 1 | 0 | 0 |
| 0 | 0 | 0 | 0 | 0 |
| 0 | 0 | 0 | 0 | 0 |

FIG.8(b)

| -1 | -1 | -1 | -1 | -1 |
|---|---|---|---|---|
| -1 | -1 | -1 | -1 | -1 |
| -1 | -1 | 40 | -1 | -1 |
| -1 | -1 | -1 | -1 | -1 |
| -1 | -1 | -1 | -1 | -1 |

FIG.8(c)

| -1 | -1 | -1 | -1 | -1 |
|---|---|---|---|---|
| -1 | 4 | 4 | 4 | -1 |
| -1 | 4 | 48 | 4 | -1 |
| -1 | 4 | 4 | 4 | -1 |
| -1 | -1 | -1 | -1 | -1 |

IMAGE PROCESSING DEVICE

FIELD OF THE INVENTION

The present invention relates to an image processing device for use in scanners, digital photocopiers, facsimiles, etc., for performing optimum processing of a picture signal scanned from a document in accordance with resolution of the picture signal.

BACKGROUND OF THE INVENTION

Conventionally known is an image processing device with a particular technique used therefor, i.e. the technique of making read line density (hereinafter referred to as resolution) in a sub scanning direction variable by changing an operational speed of a document feeding apparatus or a document scanning apparatus. Employing this technique, the image processing apparatus performs a reading operation of a document image by selecting resolution in the sub scanning direction in accordance with size of a memory capacity, and performs image processing of a picture signal obtained via the reading operation of the document image.

An example of an image processing device capable of performing such processing is the one disclosed in Japanese Unexamined Patent Publication No. 114996/1993 (Tokukaihei 5-114996 published on May 7, 1993). This image processing device converts the resolution in a sub scanning direction by reading out images where either a thinning treatment or a shift of scanning speed of an optical system can be selected according to a capacity of a temporary memory means used for transferring picture signals.

Nevertheless, although it is possible with the conventional arrangement to suppress a memory capacity to remain small, a problem has arisen as to a considerable impairment of image quality of a line drawing, such as deterioration of images, and more specifically, vanishment of small letters, thin lines, etc.

SUMMARY OF THE INVENTION

An object of the present invention is to provide an image processing device which, while realizing higher operational speed and reducing a capacity, can suppress impairment of image quality of a line drawing, etc., even when resolution in a sub scanning direction is reduced.

In order to attain the foregoing object, an image processing device according to the present invention, which receives a picture signal which was read out while resolution in the sub scanning direction is converted by changing a speed of reading images, includes:

(a) a region separating section for separating the picture signal into each region in accordance with the converted resolution in the sub scanning direction; and (b) a resolution and regional image processing section for performing image processing on the picture signal in accordance with the converted resolution in the sub scanning direction and each region separated by the region separating section.

In the foregoing structure, since the resolution in the sub scanning direction of a picture signal to be inputted to the image processing device has been converted, the resolution in the sub scanning direction differs from the resolution in a main scanning direction, i.e. a size of an image region in the main scanning direction differs from that in the sub scanning direction. In contrast, by employing the region separating section, the picture signal can be separated into each region according to the converted resolution in the sub scanning direction, i.e. the size of an image region in the sub scanning direction with respect to an inputted image. Consequently, the picture signal can be separated into each region with high accuracy, regardless of the converted resolution in the sub scanning direction.

Additionally, in accordance with the resolution in the sub scanning direction and each region of the picture signal which has been obtained with high accuracy as described above, the resolution and regional image processing section can apply optimum image processing to the picture signal.

Further, for example, when the speed of reading images is increased for a faster operational speed, the resolution in the sub scanning direction is reduced, i.e. the size of the image region for the inputted image becomes smaller in the sub scanning direction. Therefore, only a small memory capacity is required when storing the picture signal in a memory section, etc.

A faster and small capacity image processing device which can suppress impairment of image quality due to resolution conversion in the sub scanning direction with respect to the picture signal can thus be realized.

Note that, the resolution in the sub scanning direction in the above refers to read line density in a sub scanning direction.

Furthermore, it is preferable that the image processing device of the present invention has an arrangement in which:

the region separating section calculates feature parameters indicative of a characteristic of each pixel in the picture signal and carries out a correction in accordance with the resolution in the sub scanning direction with respect to a resolution dependent feature parameter of the feature parameters, which is dependent on the resolution in the sub scanning direction so as to separate said picture signal into each region using said feature parameters including the corrected resolution dependent feature parameter.

In accordance with the foregoing structure, the region separating section carries out a correction for the resolution dependent feature parameter which is one of the calculated feature parameters and which depends on the resolution in the sub scanning direction, according to a level of the resolution in the sub scanning direction, i.e. the size of a region in the sub scanning direction with respect to an image to be read out, and separates the picture signal into each region based on the feature parameters including the corrected resolution dependent feature parameter. Thus considering the level of the resolution of the read-out picture signal in the sub scanning direction, a picture signal can be separated into each region by means of a simple correction.

In this way, region separation of a picture signal can be carried out in accordance with the resolution conversion in the sub scanning direction with high accuracy with a simple correction which does not require a complicated structure. As a result, the image processing device in which impairment of image quality caused by the resolution conversion in the sub scanning direction is suppressed can be realized.

Further, it is preferable that the image processing device of the present invention may have an arrangement in which the resolution and regional image processing section is a filter processing section for selecting a filter factor in accordance with the converted resolution in the sub scanning direction and each region separated by the region separating section, and for performing filter processing with respect to each pixel in the picture signal by using the selected filter factor.

In the foregoing structure, the resolution and regional image processing section is the filter processing section for performing the filter processing with respect to each pixel, and it can select a filter factor which produces an optimum effect on the size of the resolution in the sub scanning direction and each region obtained with high accuracy by the region separating section. For example, for a character region in which characters, line drawings, etc. deteriorate in accordance with the reduction in the resolution in the sub scanning direction, a filter factor for heightening sharpness will be selected. In addition, for a mesh dot region where moiré becomes intense according to the reduction in the resolution in the sub scanning direction, a filter factor for raising smoothness so as to suppress moiré will be selected. Optimum filter processing can thus be applied to the resolution in the sub scanning direction and each region.

In this way, a quality image for each region can be acquired, and moreover, deterioration of image quality can be suppressed, even when the resolution in the sub scanning direction is changed.

Note that, the moiré in the above refers to an interference which is caused by an interaction between a frequency and a resolution of an image.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 7(a) is an explanatory drawing showing a filter factor which is used for a photograph region in a filter processing section when one resolution is equal to the other in main and sub scanning directions, FIG. 7(b) is an explanatory drawing showing a filter factor which is used for a character region in the filter processing section when one resolution is equal to the other in the main and sub scanning directions, and FIG. 7(c) is an explanatory drawing showing a filter factor which is used for a mesh dot region when one resolution is equal to the other in the main and sub scanning directions.

FIG. 8(a) is an explanatory drawing showing a filter factor which is used for the photograph region in the filter processing section when the resolution in the sub scanning direction is a half of that in the main scanning direction, FIG. 8(b) is an explanatory drawing showing a filter factor which is used for the character region in the filter processing section when the resolution in the sub scanning direction is a half of that in the main scanning direction, and FIG. 8(c) is an explanatory drawing showing a filter factor which is used for the mesh dot region in the filter processing section when the resolution in the sub scanning direction is a half of that in the main scanning direction.

DESCRIPTION OF THE EMBODIMENTS

[First Embodiment]

The following will explain the first embodiment of the present invention with reference to FIGS. 1 through 11.

Figure 1:
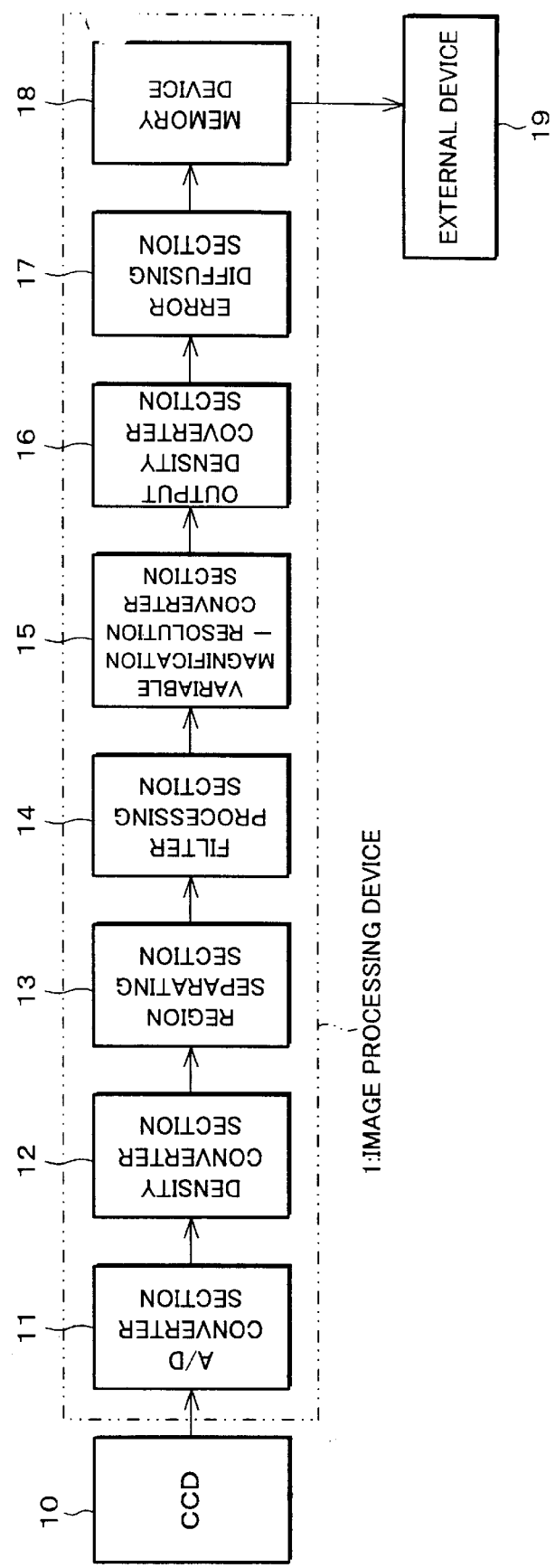
FIG. 1 is a block diagram showing a structure of an image processing device according to the first embodiment of the present invention.
Figure 2:
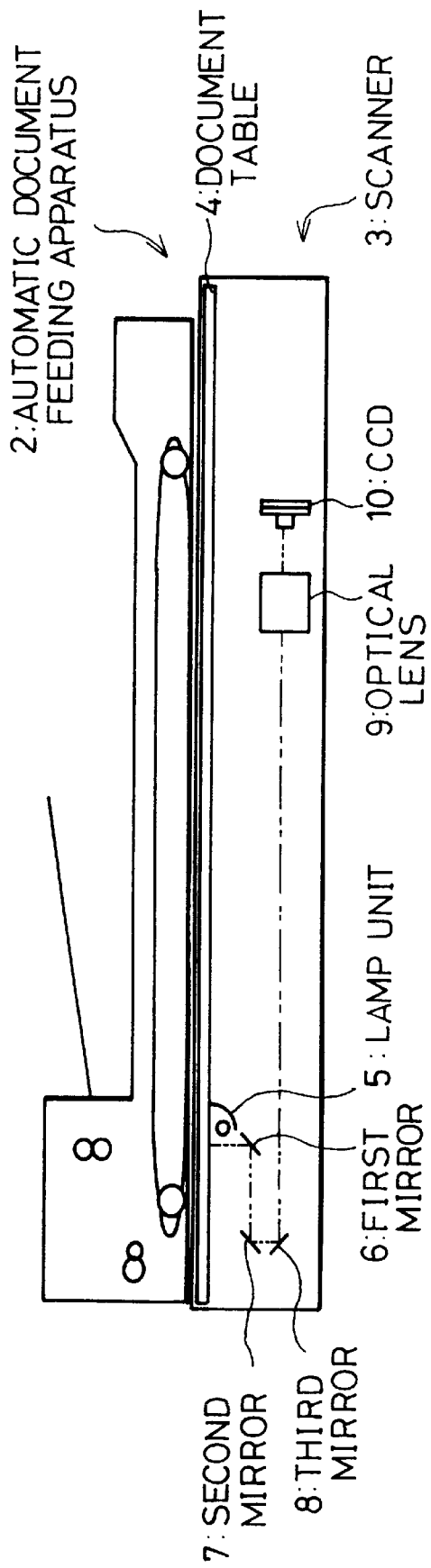
FIG. 2 is a cross section showing a structure of an automatic document feeding apparatus and a scanner for reading out a picture signal inputted to the image processing device.

FIG. 1 is a block diagram showing the structure of an image processing device 1 according to the present embodiment while FIG. 2 shows an automatic document feeding apparatus 2 and a scanner 3, which read out picture signals inputted to the image processing device 1.

As shown in FIG. 2, images of a document transported by the automatic document feeding apparatus 2 are read out as picture signals by the scanner 3. The scanner 3 is made up of:

a document table 4, where a document is placed;

a lamp unit 5 for exposing an image surface of the document;

a first mirror 6, which deflects a reflected image from the document in a predetermined direction;

a second mirror 7 and a third mirror 8, which further deflect the reflected image off the first mirror 6 in another predetermined direction;

an optical lens 9 for focusing the reflected image, deflected by the third mirror 8, on a predetermined position on a Charge Coupled Device (hereinafter referred to as CCD) discussed below; and a CCD 10, which consecutively performs photoelectric transfer of the focused reflected image for output as a picture signal.

The image processing device 1 according to the present embodiment, illustrated in FIG. 1, is to perform image processing of the read-out picture signals by using the foregoing automatic document feeding apparatus 2 and the scanner 3.

Operational speed of the automatic document feeding apparatus 2 and the scanner 3 is variable. Therefore, under the condition where processing speed of the image processing device 1 is constant, by changing the operational speed of the automatic document feeding apparatus 2 and the scanner 3, line density (hereinafter referred to as resolution) in a sub scanning direction of a picture signal to be read out can be converted. The CCD 10 adopted in the present embodiment is a CCD in which common reading resolution (hereinafter referred to as base resolution) of a picture signal to be read out by the scanner 3 is 600 Dpi (dot/inch). Accordingly, the resolution in a main scanning direction is 600 Dpi, i.e. the base resolution, whereas the resolution in the sub scanning direction is set to become the base resolution of 600 Dpi when the operational speed of the automatic document feeding apparatus 2 and the scanner 3 is 120 mm/sec.

The following will explain in detail as to how the image processing device 1 performs image processing of a picture signal which is read out when the operational speed of the automatic document feeding apparatus 2 and the scanner 3 is changed from 120 mm/sec into 240 mm/sec. By thus setting the operational speed of the automatic document feeding apparatus 2 and the scanner 3, the resolution in the sub scanning direction becomes 300 Dpi, i.e. a half of the base resolution of 600 Dpi.

First, a picture signal outputted from the CCD 10 (the resolution in the main scanning direction is 600 Dpi, that in the sub scanning direction 300 Dpi) is inputted to an A/D converter section 11 of the image processing device. Since the picture signal outputted from the CCD 10 is an analog signal, it is initially converted to a digital signal in the A/D converter section 11. The digital signal has 256 gradations, i.e. 8 bits.

Next, the picture signal thus converted to the digital signal is transferred to a density converter section 12. The density converter section 12 converts gradation of the CCD 10 by means of a density converter table, i.e. after finishing density conversion of the inputted picture signal, the density converter section 12 transfers the picture signal to a region separating section (region separating means) 13.

The region separating section 13 is utilized to separate images into either one of 3 types of region including a character region, a photograph region and a mesh dot region, and based on the base resolution of 600 Dpi, each parameter (feature parameter) is set. In the present embodiment, both of the first and the second feature parameters will be computed by the region separating section 13. These first and the second feature parameters will be explained below.

By the region separating section 13, with regard to each pixel in the picture signal, the maximum density Dmax and the minimum density Dmin within a 5×5 block (mask) which is made up of a target pixel P and 24 adjacent pixels (as indicated by oblique lines in FIG. 3) are determined, and then, a difference between the maximum density Dmax and the minimum density Dmin (Dmax-Dmin) is computed as a maximum density difference, which is the first feature parameter.

Further, by the region separating section 13, with regard to each pixel in the picture signal, the sum total of density difference values is computed each in the main scanning direction and sub scanning direction in the 5×5 block, and the region separating section 13 computes a smaller one of the sum totals of density difference values in the two scanning directions as complexity (a resolution dependent feature parameter) which is the second feature parameter of the target pixel P.

Figure 4:
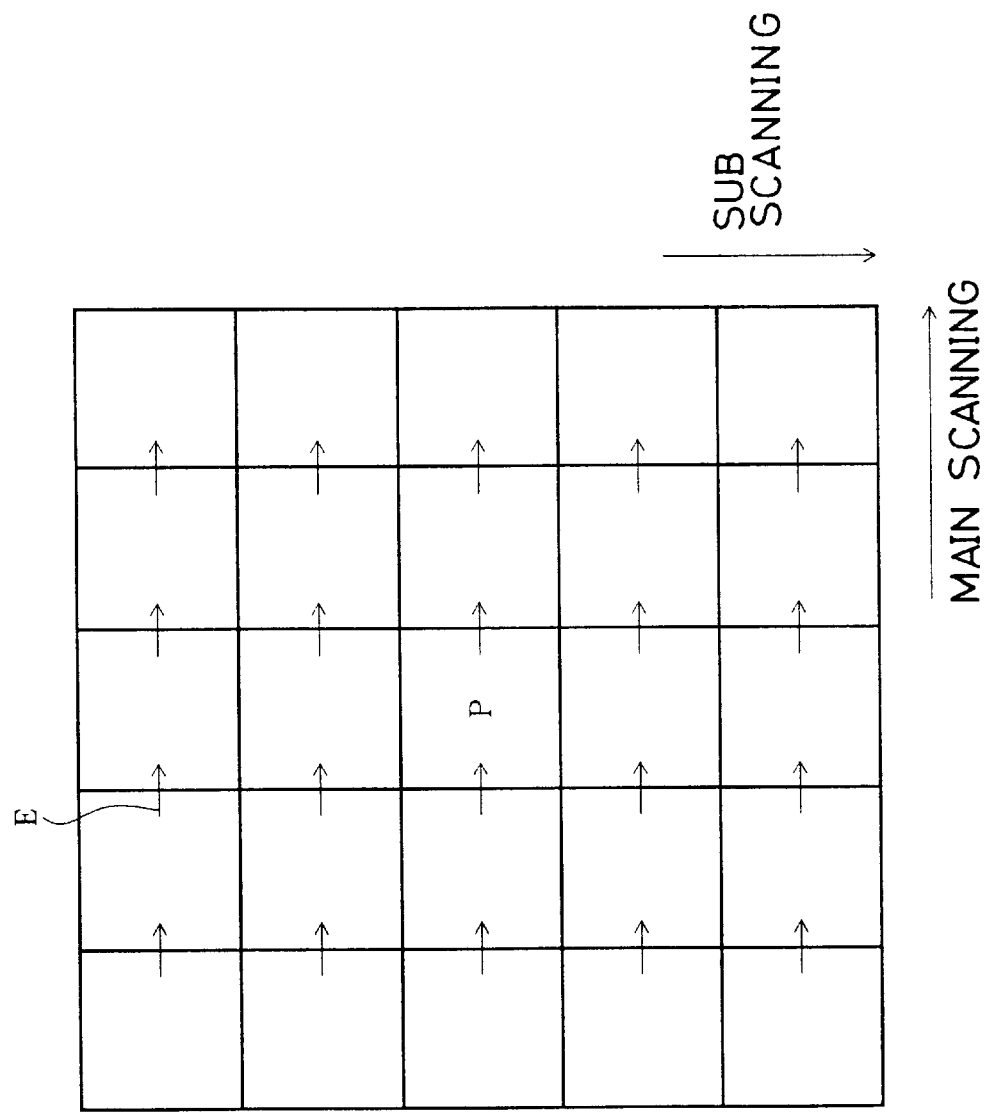
FIG. 4 is an explanatory drawing explaining a complexity computation method in an E direction in the region separating section.
Figure 5:
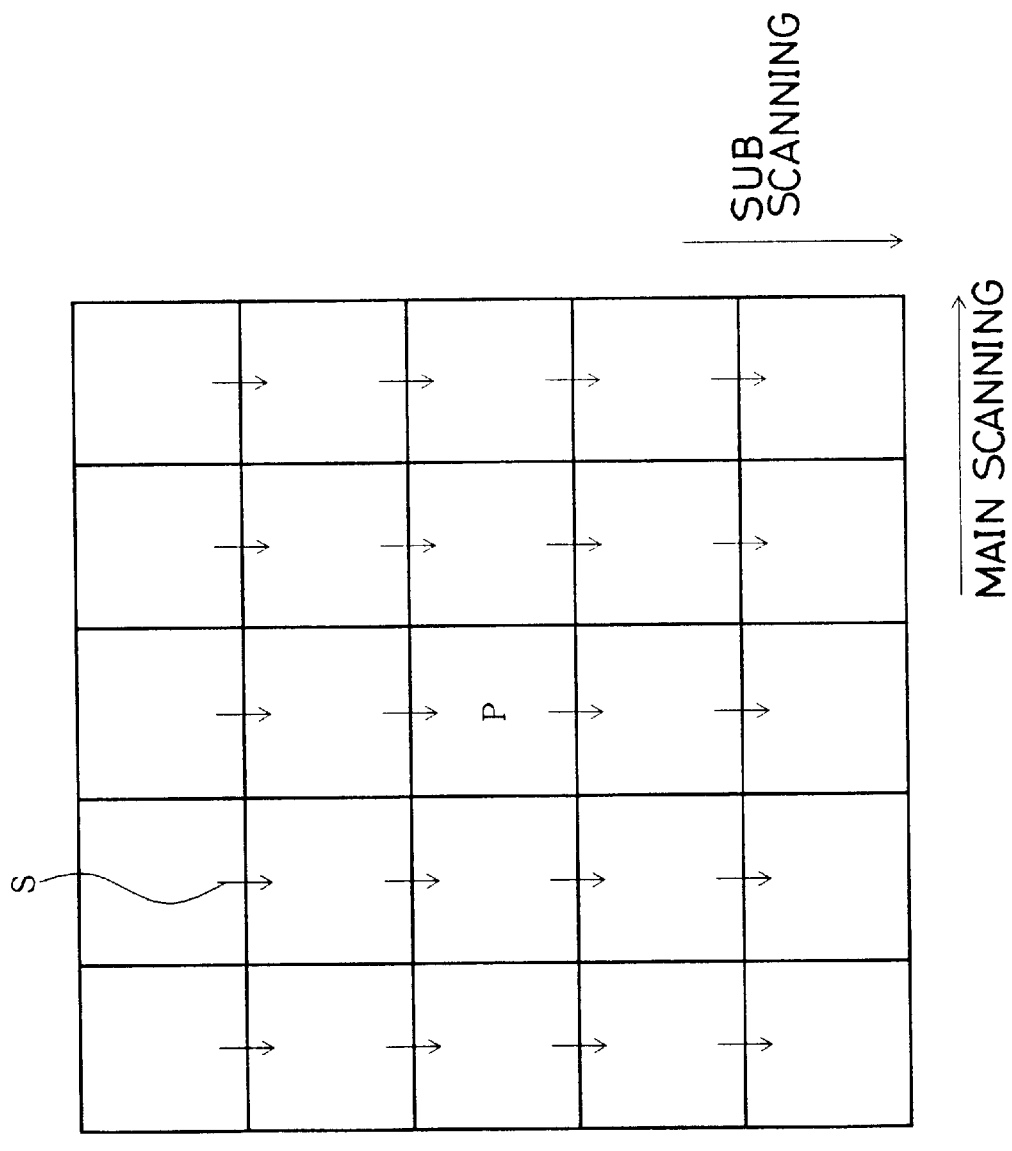
FIG. 5 is an explanatory drawing explaining a complexity computation method in an S direction in the region separating section.

Next, a computing method of the sum total of density difference values in the main and sub scanning directions, respectively, will be discussed in detail below, with reference to FIGS. 4 and 5. The sum total of density difference values in the main scanning direction is obtained by, first, computing a difference value of density between two consecutive pixels in a direction of arrow E shown in FIG. 4, and then, by adding all these difference values within the 5×5 block. Likewise, the sum total of density difference values in the sub scanning direction is computed by a similar method except that the direction of two consecutive pixels for determining a density difference value is in a direction of arrow S as shown in FIG. 5.

Figure 6:
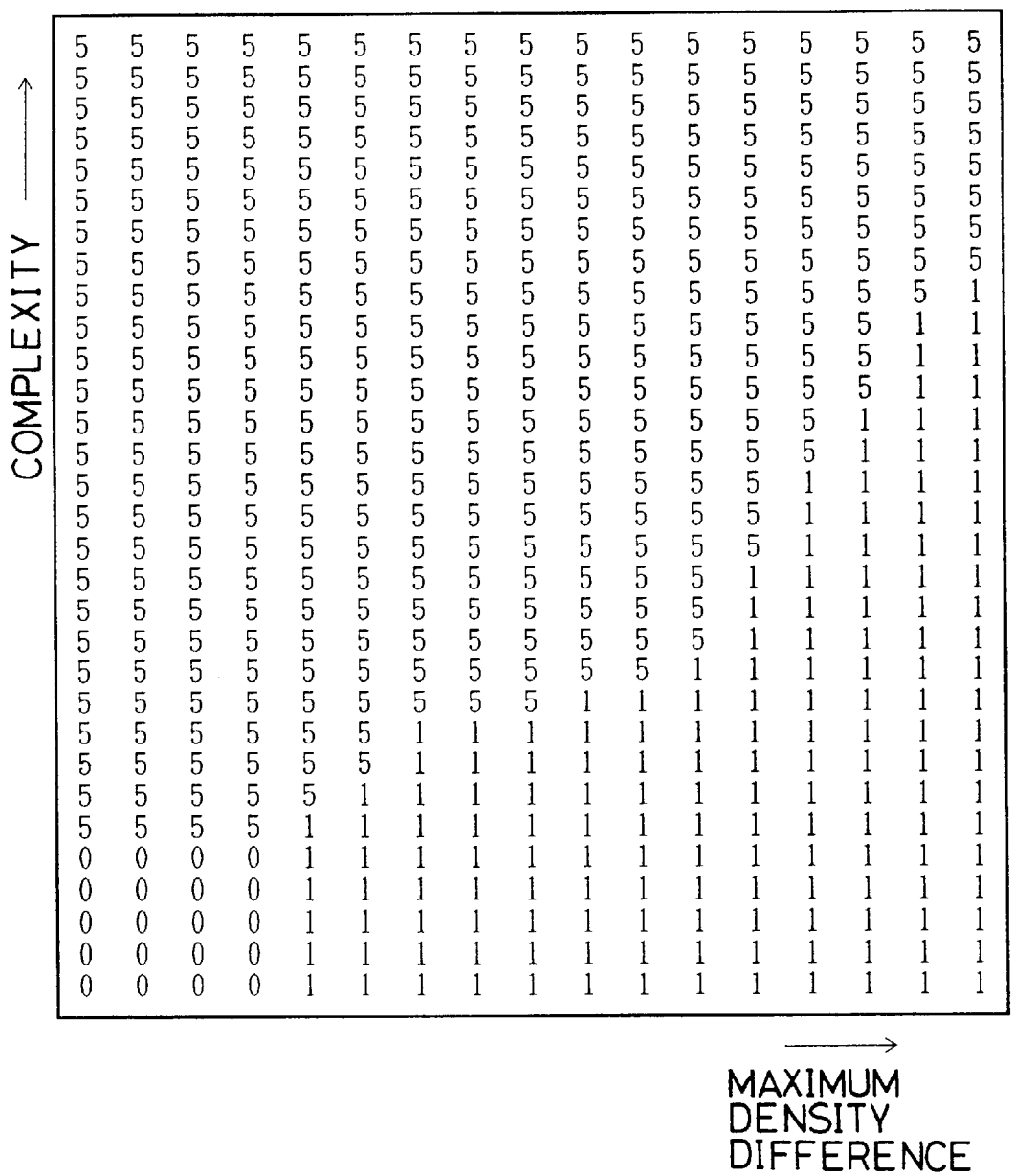
FIG. 6 is an explanatory drawing showing a region separating look-up table which is used when the region separating section separates each pixel into each region.

By referring to a region separating look-up table, the region separating section 13 identifies as to whether a target pixel P belongs which of three regions, i.e. the character region, the photograph region and the mesh dot region. With regard to the region separating look-up table, on a two dimensional plane having axes of maximum density difference (the first feature parameter) and complexity (the second feature parameter), boundaries separating each region from the other have been presetted, and the regions are classified with respect to the first and second feature parameters in accordance with these boundaries. As shown in FIG. 6, on the region separating look-up table, boundaries for defining each region are provided, considering a relationship between each feature parameter and each region beforehand. Examples of such a relationship between each feature parameter and each region include:

① where the maximum density difference is large, there is little possibility of being the photograph region or the mesh region having a continuous gradation, but the possibility of being the character region is high; and ② where the complexity is large, there is little possibility of being the photograph region, but the possibility of being the mesh dot region is high.

It is noted, here, that in case of the resolution in the main scanning direction and that in the sub scanning direction being equally 600 Dpi, sizes of the main and sub scanning directions with regard to an image detected in the 5×5 block (mask) become equal. However, in case of the resolution in the sub scanning direction being 300 Dpi, i.e. a half of the resolution in the main scanning direction, size of the sub scanning direction is twice larger than that of the main scanning direction with regard to the image detected in the 5×5 block (mask). However, since the resolution in the sub scanning direction is set low, an image detected in the sub scanning direction becomes rough accordingly.

As discussed above, in the present embodiment, parameters of each pixel computed in the region separating section 13 are the maximum density difference and the complexity, of which the maximum density difference is independent of the resolution of either of the main and sub scanning directions. On the contrary, since the complexity is determined by detecting the sum total of density difference values between adjacent pixels with regard to each of the main scanning direction and the sub scanning direction, the complexity is dependent on the size within a detected area of an image which is detected in the 5×5 block (mask). Accordingly, a correction is made in the region separating section 13 by giving a correction value to the sum total of density difference values in the sub scanning direction so that it becomes equivalent to the sum total of density difference values in case of the resolution being the base resolution of 600 Dpi. In this way, even when the resolution in the sub scanning direction is low, the results of region separation can be obtained with almost the same accuracy as in the case of the normal resolution.

More specifically, in the present embodiment, the detected area of an image in the scanning direction is larger than that in the main scanning direction, and the resolution in the sub scanning direction is lower than that in the main scanning direction. A larger detected area of the image means that the sum total of the density difference values will be larger as compared with the case where the detected area was normal, i.e. the resolution was the base resolution. In addition, if the resolution is thus low, the sum total of density difference values with regard to an image having a certain frequency, and in particular high frequency, is expected to become large. Therefore, by multiplying the sum total of density difference values in the sub scanning direction by a coefficient of one or less, it is possible to calculate the sum total of density difference values equivalent to that in case of both of the resolution in the main scanning direction and that in the sub scanning direction being the base resolution. That is, regardless of a difference in the resolution, it is always possible to obtain the same complexity which would have been obtained if both resolution in the main scanning direction and that in the sub scanning direction were the base resolution. Here, the results of experiment using each region of a document (the character region, the photograph region and the mesh dot region) and experiment using several frequencies in the mesh dot region have shown that the appropriate coefficients, by which the total sum of the density difference values will be multiplied, range from 0.6 through 0.8.

The correction value thus determined is used to multiply the sum total of density difference values in the sub scanning direction which has been computed in the region separating section 13, so as to carry out a correction only for the sub scanning direction. On the contrary, the sum total of density difference values in the main scanning direction is calculated without any correction. As a result of comparison between both sum totals of the density difference values in the two scanning directions, a smaller value is selected as the complexity.

In accordance with the complexity thus determined and the results of maximum density difference, the character region, the photograph region and the mesh dot region are classified. Consequently, even when the sub scanning direction employs either one of two types of resolution, i.e. the base resolution (600 Dpi) or a half of the base resolution (300 Dpi), the results of region separation can be obtained almost with the same accuracy, regardless of a difference in the resolution.

Furthermore, when the resolution in the sub scanning direction is a half of the base resolution and correction cannot be made with the foregoing correction value due to a characteristic of input devices (an automatic document feeding apparatus 2 and a scanner 3), by providing another type of region separating means as the second region separating section, reduction in accuracy of the region separation can be suppressed.

Note that, in the region separating section 13, region separating accuracy which is independent of change of the resolution in the sub scanning direction is realized by correcting the complexity (the second feature parameter). However, the same effect can also be obtained (a) by correcting the region separating look-up table in accordance with the resolution in the sub scanning direction, (b) by providing a plurality of region separating look-up tables for changes in the resolution in the sub scanning direction beforehand, or (c) by changing a parameter itself, which is related to the sub scanning direction, according to the resolution.

In a filter processing section 14, using filter factors to which the results of region separation obtained from the region separating section 13 are fedback, image processing is performed on each region with an optimum filter. The filter processing here refers to a process of obtaining a density value of a target pixel from the results of a convolution calculation of a block (matrix) and a filter factor, wherein the block (matrix) includes density value of the target pixel and adjacent pixels of a picture signal, and the filter factor is a matrix of a weighted coefficient.

Figure 3:
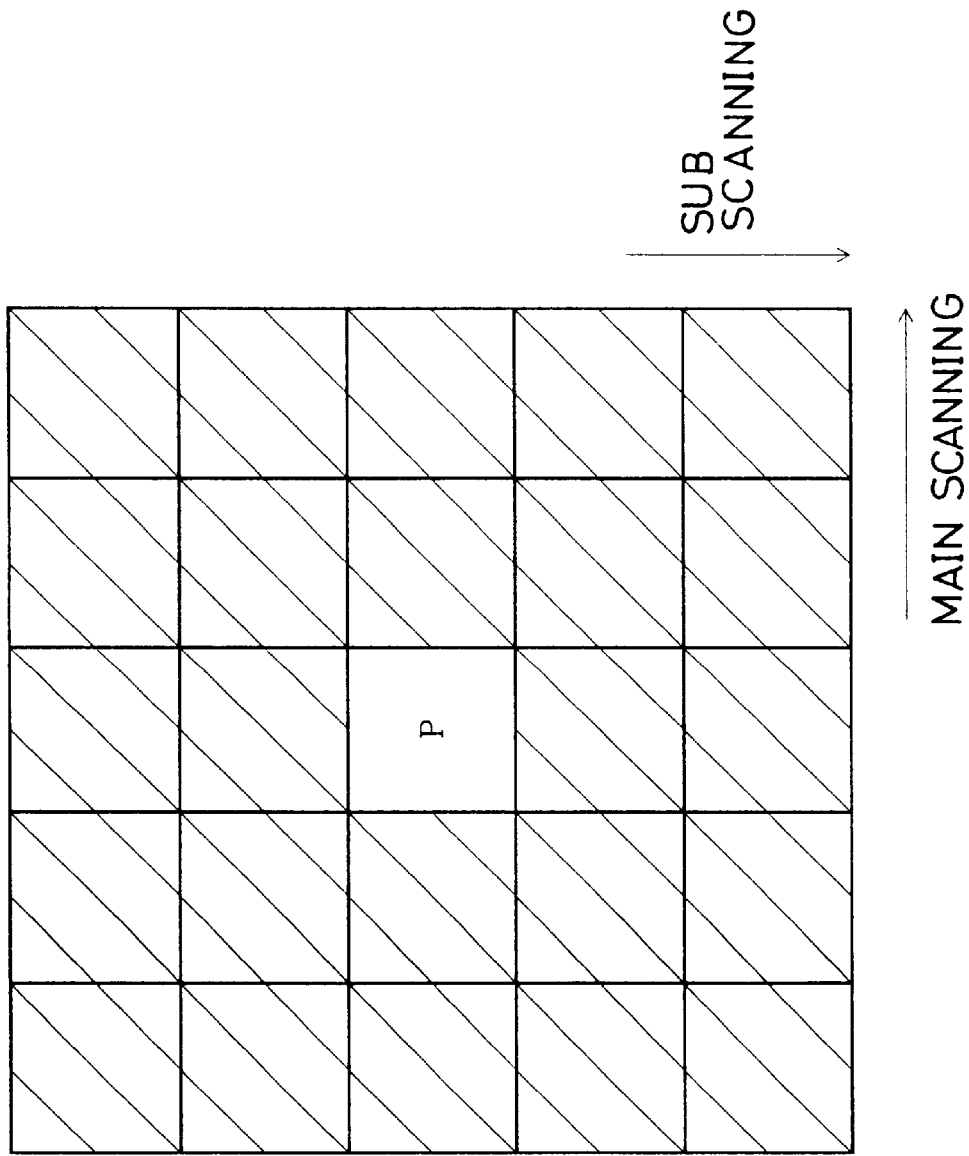
FIG. 3 is an explanatory drawing showing a 5×5 block consisting of a target pixel of a picture signal and adjacent pixels in a region separating section of the image processing device.

FIGS. 7(a) through 7(c) show optimum filter factors to be used in filter processing of each region which is performed when the resolution of the two scanning directions are both 600 Dpi. FIGS. 8(a) through 8(c) show optimum filter factors for minimizing impairment of image quality in each region when the resolution is changed to 300 Dpi only in the sub scanning direction. Each filter factor shown in FIGS. 7(a) through 7(c) and 8(a) through 8(c) is to be used in the convolution calculation with the 5×5 block made up of the target pixel P and the adjacent pixels as shown in FIG. 3. Note that, the filter factors shown in FIG. 7(a) and FIG. 8(a) are for the photograph region, filter factors shown in FIG. 7(b) and FIG. 8(b) are for the character region, and filter factors shown in FIG. 7(c) and FIG. 8(c) are for the mesh dot region.

Comparing FIG. 7(a) with FIG. 8(a), it can be seen that the filter factors used in the two figures are identical because, in the photograph region, a change in the resolution hardly causes a major change in an image.

Next, comparing FIG. 7(b) with FIG. 8(b), it can be seen that sharpness of the filter factor is more heightened when the resolution in the sub scanning direction is 300 Dpi. This is to suppress deterioration of line drawings, characters, etc., caused in accordance with reduction in the resolution.

Next, comparing FIG. 7(c) with FIG. 8(c), it can be seen that smoothness of the filter factor is more heightened when the resolution in the sub scanning direction is 300 Dpi. This is to suppress an interference so-called moiré, which is caused by an interaction between an image frequency and resolution as the resolution in the sub scanning direction is reduced, by raising smoothness by means of the filter factor as shown in FIG. 8(c).

As discussed above, when performing filter processing, high-quality images can invariably be obtained by selecting an optimum filter factor according to the resolution in the sub scanning direction and each type of region, thereby suppressing deterioration of images, even when the resolution in the sub scanning direction is lower than the base resolution as in the present embodiment.

A picture signal which was subjected to the filter processing in the filter processing section 14 is then inputted to a variable magnification-resolution converter section 15. When the resolution in the main scanning direction differs from that in the sub scanning direction in a picture signal to be inputted to the image processing device 1, it is necessary to align them by some means before transferring the picture signal to an external device 19 such as a monitor of a personal computer (hereinafter referred to as PC monitor) because, when the resolution is different between the two scanning directions, an image becomes hard to deal with in the external device 19. For example, when a picture signal, in which the resolution in the sub scanning direction is a half of that in the main scanning direction, is displayed by the PC monitor, size of the image actually displayed on a screen is affected in a way that the sub scanning direction of the image becomes twice larger than the main scanning direction.

In order to solve the foregoing problem, processing is performed in the variable magnification-resolution converter section 15 for aligning one resolution with the other in the two scanning directions with regard to the picture signal to be transferred to the external device 19. As an algorithm for aligning one resolution with the other in the two scanning directions in the picture signal, two methods, i.e. a nearest neighbor method and an n-th interpolation method will be explained below. It is noted that both algorithms are identical in terms of performing processing by either interpolation or thinning out of a pixel.

Figure 9:
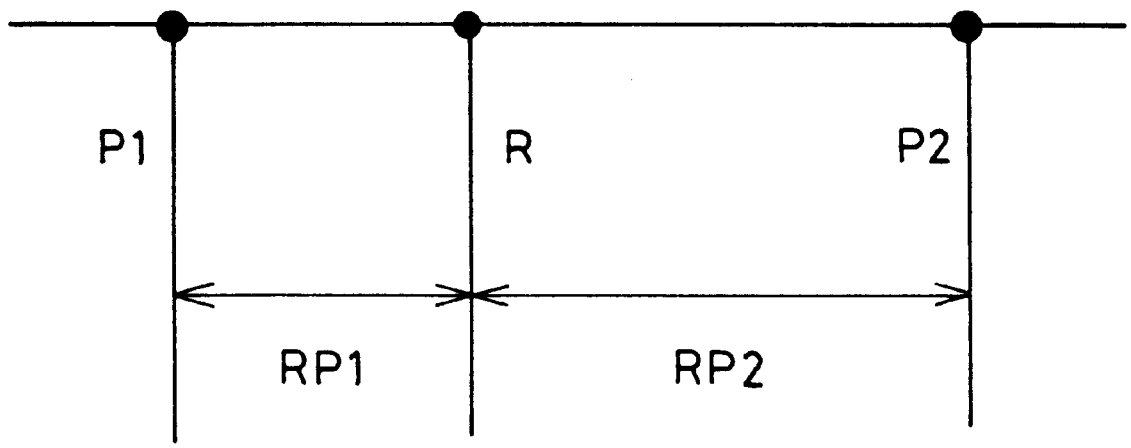
FIG. 9 is an explanatory drawing explaining an algorithm which is employed in a variable magnification-resolution converter section.

First, the following will explain the nearest neighbor method. In the nearest neighbor method, initially, the resolution is converted so as to compute location of a pixel to be interpolated or thinned out. Then, with respect to the computed location of the pixel, density of the nearest original pixel (before processing) is detected so that the density of the pixel becomes density of an interpolated pixel. As shown in FIG. 9, the interpolated pixel is represented by R, and in the vicinity of which are two adjacent original pixels whose picture signals are represented by P1 and P2. Since the purpose here is to perform processing for aligning the resolution in the sub scanning direction with the resolution in the main scanning direction, interpolation is applied only to the picture signal in the sub scanning direction.

When the distance between the interpolated pixel R and the picture signal P1 of the original pixel is RP1 and the distance between the interpolated pixel R and the picture signal P2 of the original pixel is RP2, density of the interpolated pixel R is determined as follows:

(a) when RP1>RP2, density of the picture signal P2 is determined as the density of the interpolated pixel R, and
(b) when not RP1>RP2, density of the picture signal P1 is determined as the density of the interpolated pixel R. That is, the density of the interpolated pixel R is determined by the closer of the picture signals P1 and P2 of the original pixels.

On the other hand, in the n-th interpolation method, as in the case of the nearest neighbor method, the location of the pixel to be interpolated is computed first. For the foregoing reasons, the interpolation is applied only to the picture signal in the sub scanning direction. Next, as shown in FIG. 9, the distances RP1 and RP2, respectively from the picture signals P1 and P2 to the interpolated pixel R in the vicinity thereof are computed. The density of the interpolated pixel R will be computed according to the following equation:

the density value of the interpolated pixel $R=(P1 \times RP2 + P2 \times RP1)/(RP1 + RP2)$ This equation is a first order interpolation method of the n-th interpolation methods, and the calculation can also be performed with higher orders, such as a second or third order interpolation method.

In this way, the picture signal whose one resolution is aligned with the other in the two scanning directions in the variable magnification-resolution converter section 15 is, via an output density converter section 16 and an error diffusing section 17, inputted to a memory device 18. Due to thus aligned resolution of a picture signal between the two scanning directions, at the stage where the picture signal is inputted to the memory device 18, the extent of image deterioration can be maintained at a low level.

As explained above, the image processing device according to the present embodiment carries out a correction of the complexity which is a feature parameter used for the region separation of a picture signal, in accordance with the resolution in the sub scanning direction differing from that in the main scanning direction. In addition, with regard to filter factors employed in the filter processing section 14, considering the resolution in the sub scanning direction, processing is performed by selecting a value in accordance with the resolution in the sub scanning direction and each region of the picture signal. Therefore, even when the resolution in the sub scanning direction is set lower than that in the main scanning direction for the purpose of increasing a speed of reading images, an image process optimum for the resolution in the sub scanning direction can be performed.

By thus reducing the resolution in the sub scanning direction by increasing the speed of reading images in the sub scanning direction, a faster operation and a smaller capacity are realized, and additionally, impairment of image quality can be prevented.

[Second Embodiment]

Figure 10:
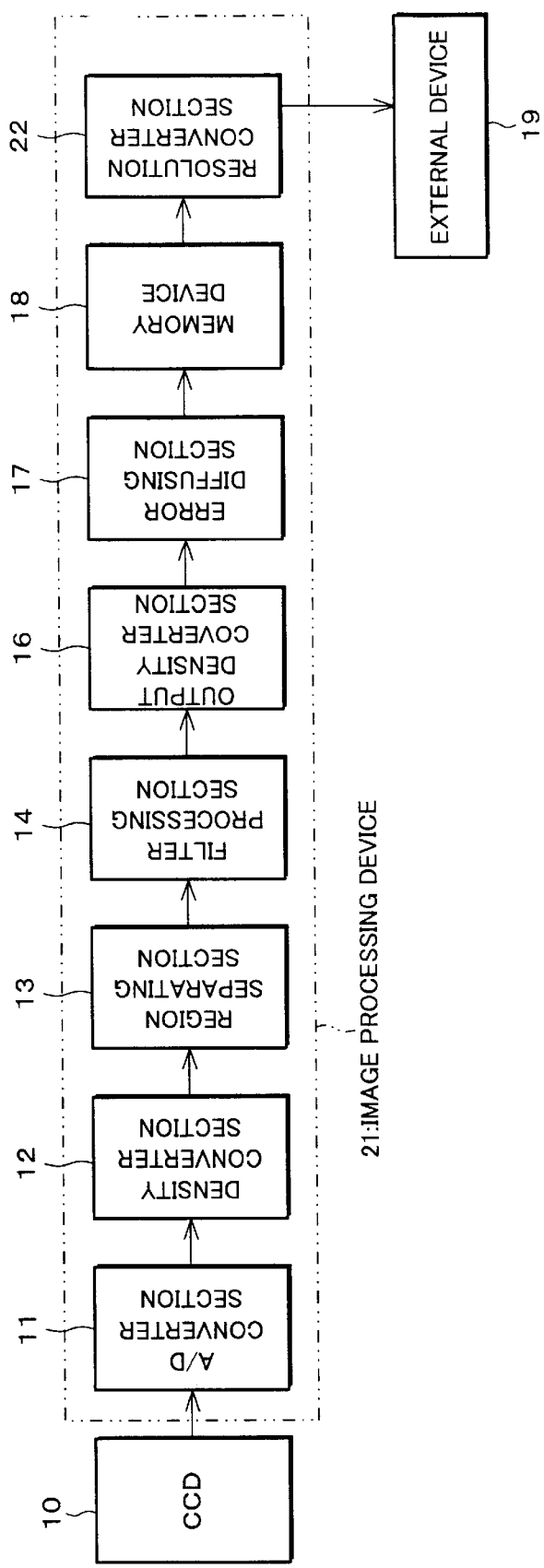
FIG. 10 is a block diagram showing a structure of an image processing device according to the second embodiment of the present invention.
Figure 11:
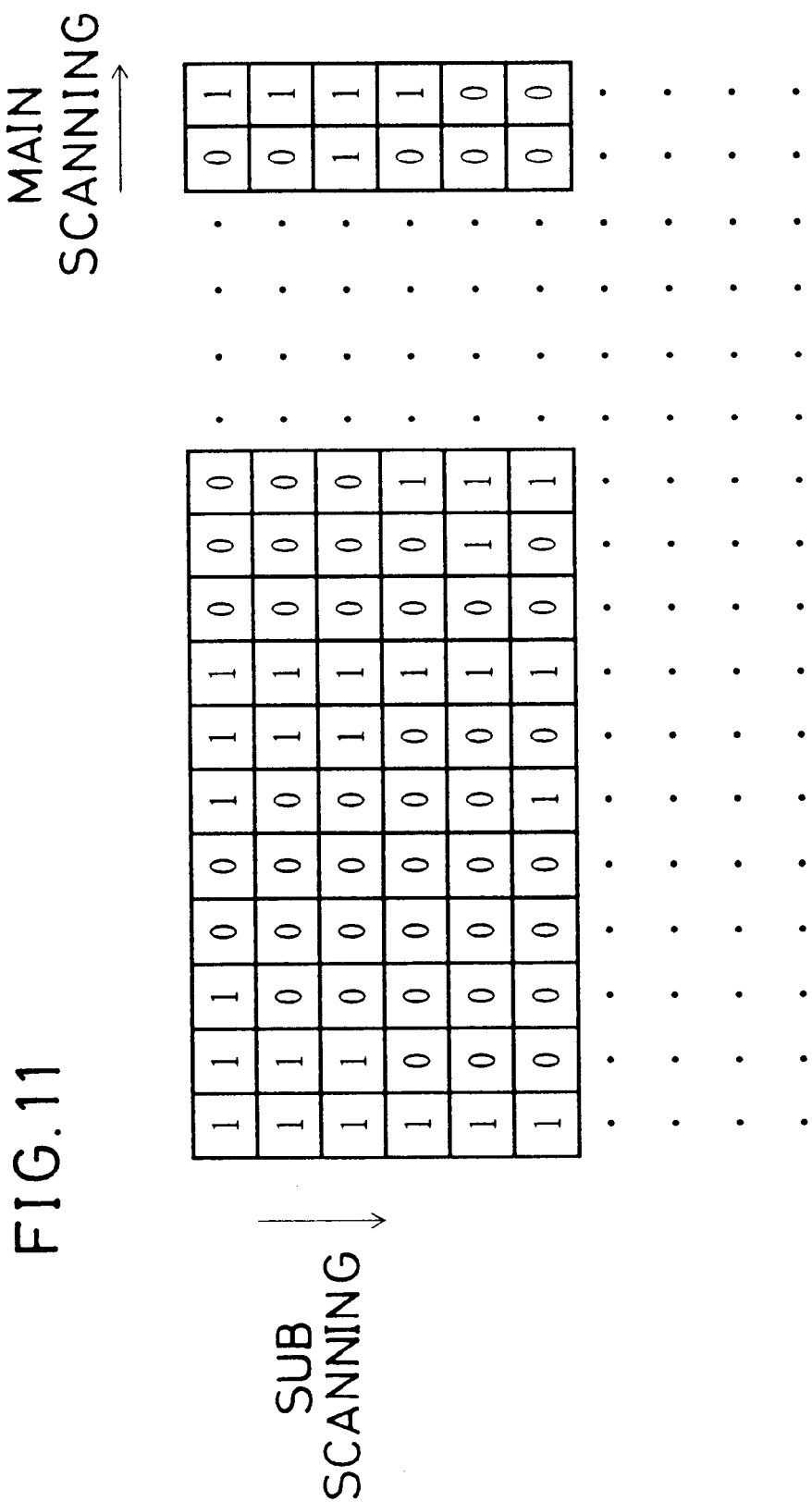
FIG. 11 is an explanatory drawing showing picture signals which are stored in a memory device of the image processing device.
Figure 12:
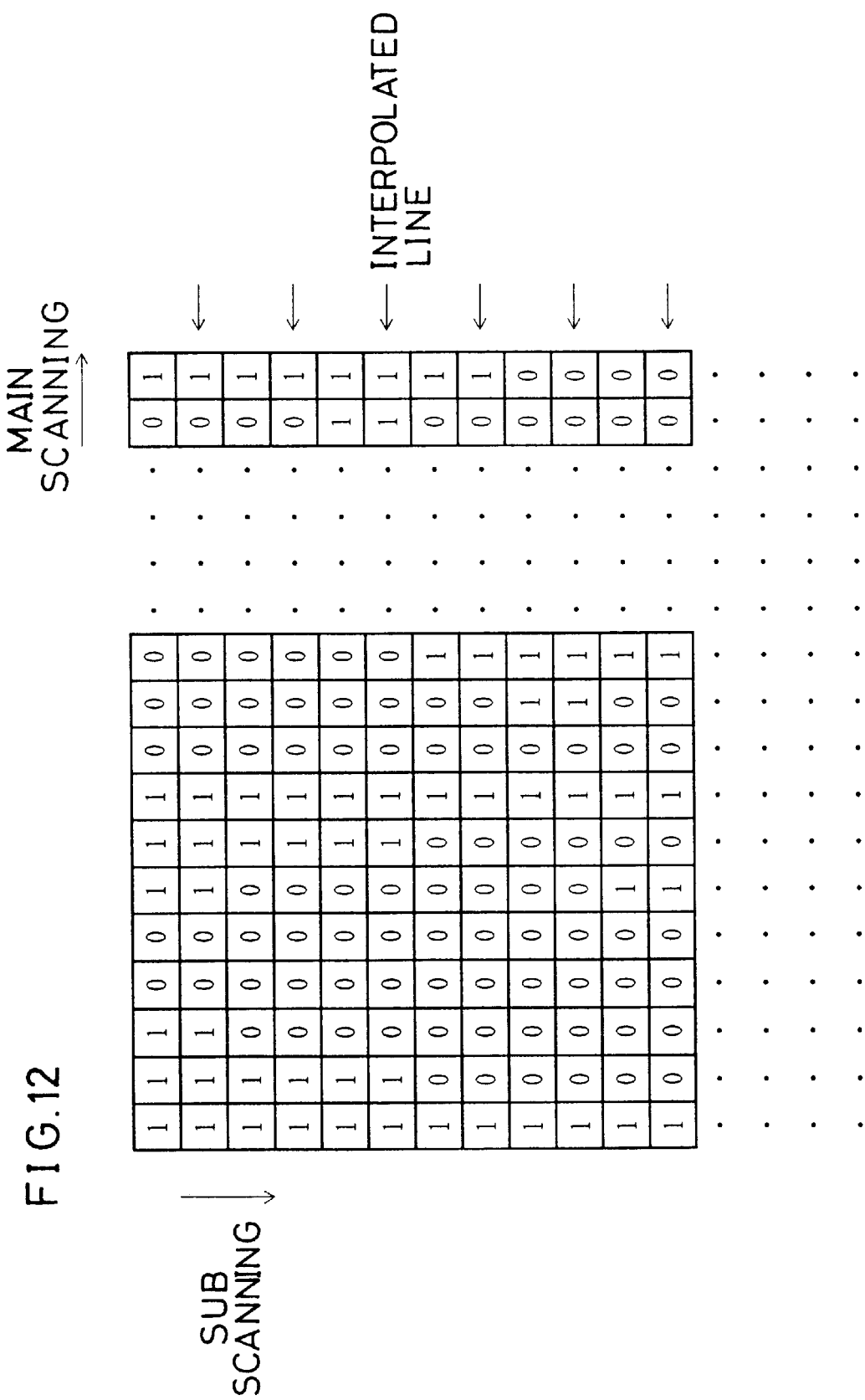
FIG. 12 is an explanatory drawing showing picture signals when the picture signals of FIG. 11 are transferred to an external device.

The following will explain another embodiment of the present invention with reference to FIGS. 10 through 12. For ease of explanation, structures having the equivalent functions to those shown in the drawings pertaining to the first embodiment above will be given the same reference numerals, and explanation thereof will be omitted here.

An image processing device 21 according to the present embodiment has an equivalent structure to the image processing device 1 of the first embodiment, except for a method of performing processing of a picture signal while the picture signal is outputted from the filter processing section 14 and transferred to the external device 19.

As in the image processing device 1, when the picture signal outputted from the filter processing section 14 is stored in a memory device 18 after the resolution conversion processing of the picture signal in the sub scanning direction has been performed in a variable magnification-resolution converter section 15, low resolution in the sub scanning direction is converted to high resolution as in the present embodiment, i.e. pixels of the original image are interpolated before the picture signal is stored in the memory device 18, thereby requiring a memory device with a larger capacity than a capacity required to store the original image.

In the light of the foregoing problem, the image processing device 21 of the present embodiment, as shown in FIG. 10, transfers the picture signal outputted from the filter processing section 14, skipping the variable magnification-resolution converter section 15 but via an output density converter section 16 and an error diffusing section 17, to the memory device 18. When performing such processing, at the stage where the picture signal is stored in the memory device 18, the resolution in the sub scanning direction of the picture signal remains low, i.e. the original image is not yet interpolated. For this reason, the memory device 18 does not require the large capacity. In other words, in this processing method, the lower the resolution in the sub scanning direction of the read-out image is, the smaller the capacity required for the memory device 18.

However, as discussed above, the picture signal transferred to the external device 19 becomes hard to deal with if the resolution thereof in the main scanning direction differs from that in the sub scanning direction. Therefore, the picture signal stored in the memory device 18 is subsequently transferred to a resolution converter section 22 which aligns the respective resolution in the two scanning directions.

As in the above, performing resolution conversion processing after input of the picture signal to the memory device 18 enables the picture signal to be converted to the manageable one while suppressing the capacity of the memory device 18. The following will provide a concrete explanation of the image processing method in accordance with a structure of the image processing device 21 of the present embodiment based on FIGS. 11 and 12.

FIG. 11 is a schematic drawing showing a picture signal stored in the memory device 18, in which the resolution in the sub scanning direction of the picture signal has not been converted. Here, the picture signal stored has the resolution in the main scanning direction of 600 Dpi and the resolution in the sub scanning direction of 300 Dpi.

The picture signal thus stored is, by being subsequently scanned in the main scanning direction by the resolution converter section 22, transferred to the external device 19.

When the resolution in the sub scanning direction is equal to that in the main scanning direction, a location of pixel to be transferred next after finishing transfer in the main scanning direction shifts in the sub scanning direction, and to a head of the main scanning direction. In the present embodiment, however, since the resolution in the sub scanning direction is a half of that in the main scanning direction, the location of the pixel to be transferred next shifts not in the sub scanning direction but only to the head in the main scanning direction. Thus, the picture signal to be transferred to the external device 19 by the resolution converter section 22 is transferred as if the picture signal on the second line were to be transferred, but in reality, the previously transferred picture signal is transferred again. Finishing transfer of the picture signal on the same line, the scan is shifted one line in the sub scanning direction, and concurrently, the pixel at the head of the main scanning direction is transferred. By repeating this operational cycle, the picture signal as shown in FIG. 12 is transferred to the external device 19.

The resolution converter section 22 for converting the resolution in accordance with the foregoing method has a simple structure because, when converting the resolution in the sub scanning direction by integer multiples, the number of times for repeating the scan on the same line is equal to the integer.

Adopting the foregoing structure can reduce the capacity of the memory device 18, thereby cutting cost. Additionally, the use of the structure simplifies handling of a picture signal when it is transferred to the external device 19, thereby making image processing easier.

Note that, it is also possible that the image processing device 21 of the present embodiment, which converts the resolution after a picture signal is stored in the memory device 18, be combined with the structure of the image processing apparatus 1 of the first embodiment above, which converts the resolution before transferring the picture signal to the memory device 18, so that the both structures can be switched alternately in accordance with the purpose of image processing.

As discussed above, in the structure of converting the resolution before transferring the picture signal to the memory device 18, the resolution in the sub scanning direction has been converted to high resolution prior to the processing by the error diffusing section 17, thereby preventing impairment of image quality. However, the capacity of the memory device 18 requires to be increased for the size of the increased resolution in the sub scanning direction. In contrast, even though image quality is impaired to some extent, the structure of converting the resolution after storing the picture signal in the memory device 18 simplifies handling of the picture signal when it is transferred to the external device 19, and moreover, can minimize the capacity of the memory device 18.

Consequently, as shown above, by making the two structures switchable, a setting can be changed in accordance with a purpose of processing between the structure of converting the resolution prior to the memory device 18, which is selected to suppress impairment of image quality, and the structure of converting the resolution after the memory device 18, which is selected to suppress the capacity of the memory device 18.

Note that, it is possible with the method of converting the resolution after the memory device 18 to detect a state of adjacent pixels of a line (pixels to be transferred) requiring interpolation (repetitious scan) so as to determine as to which pixel should be transferred based on the results of detection.

As described, the image processing device according to the present invention which receives the picture signal which was read out while the resolution in the sub scanning direction is converted by changing a speed of reading images, is made up of:

(a) region separating means for separating the picture signal into each region in accordance with the converted resolution in the sub scanning direction;
(b) resolution and regional image processing means for performing image processing on the picture signal in accordance with the converted resolution in the sub scanning direction and each region separated by the region separating means.

In accordance with the foregoing structure, since the resolution in the sub scanning direction of the inputted picture signal has been converted, the resolution in the sub scanning direction of the picture signal differs from that in the main scanning direction, i.e. the size of an image region is not equal to each other in the two scanning directions. In contrast, by utilizing the region separating means, the picture signal can be separated into each region with high accuracy according to the converted resolution in the sub scanning direction, more specifically according to the size of a region in the sub scanning direction with respect to an image to be inputted, regardless of a change in the resolution in the sub scanning direction.

Furthermore, the resolution and regional image processing means can perform optimum image processing on the picture signal in accordance with the resolution in the sub scanning direction and each region of the picture signal obtained with high accuracy as described above.

Additionally, for example, increasing the speed of reading an image for the purpose of attaining a high-speed operation results in the low resolution, i.e. the size of a region for the image to be inputted becomes smaller in the sub scanning direction, and therefore, only a small capacity is required for storing the picture signal in memory means and the like.

A high-speed and small capacity image processing device which is capable of suppressing impairment of image quality caused by the resolution conversion of a picture signal in the sub scanning direction can thus be realized.

Note that, the resolution in the sub scanning direction here refers to a read line density in the sub scanning direction.

Further, the image processing device of the present invention may have an arrangement in which the region separating means calculates feature parameters indicative of a characteristic of each pixel in the picture signal and carries out a correction in accordance with the resolution in the sub scanning direction with respect to a resolution dependent feature parameter of the feature parameters, which is dependent on the resolution in the sub scanning direction so as to separate said picture signal into each region using the feature parameters including the corrected resolution dependent feature parameter.

In accordance with the foregoing structure, the region separating means carries out a correction for the resolution dependent feature parameter which is one of the calculated feature parameters and which depends on the resolution in the sub scanning direction, according to a level of the resolution in the sub scanning direction, i.e. the size of a region in the sub scanning direction with respect to an image to be read out, and separates the picture signal into each region based on the feature parameters including the corrected resolution dependent feature parameter. Thus considering the level of the resolution of the read-out picture signal in the sub scanning direction, a picture signal can be separated into each region by means of a simple correction.

In this way, region separation of a picture signal can be carried out in accordance with the resolution conversion in the sub scanning direction with high accuracy with a simple correction which does not require a complicated structure. As a result, the image processing device in which impairment of image quality caused by the resolution conversion in the sub scanning direction is suppressed can be realized.

Further, the image processing device of the present invention may have an arrangement in which the resolution and regional image processing means is filter processing means for selecting a filter factor in accordance with the converted resolution in the sub scanning direction and each region separated by the region separating means, and for performing filter processing with respect to each pixel in the picture signal by using the selected filter factor.

In the foregoing structure, the resolution and regional image processing means is the filter processing means for performing the filter processing with respect to each pixel, and it can select a filter factor which produces an optimum effect on the size of the resolution in the sub scanning direction and each region obtained with high accuracy by the region separating means. For example, for a character region in which characters, line drawings, etc. deteriorate in accordance with the reduction in the resolution in the sub scanning direction, a filter factor for heightening sharpness will be selected. In addition, for a mesh dot region where moiré becomes intense according to the reduction in the resolution in the sub scanning direction, a filter factor for raising smoothness so as to suppress moiré will be selected. Optimum filter processing can thus be applied to the resolution in the sub scanning direction and each region.

In this way, a quality image for each region can be acquired, and moreover, deterioration of image quality can be suppressed, even when the resolution in the sub scanning direction is changed.

Note that, the moiré in the above refers to an interference which is caused by an interaction between a frequency and a resolution of an image.

Further, the image processing device of the present invention may have an arrangement which include:

(a) memory means for storing the picture signal subjected to the image processing; and
(b) sub scanning resolution converting means for converting the resolution in the sub scanning direction into that in the main scanning direction with respect to the picture signal yet to be stored in the memory means.

It is possible in the foregoing structure to align the resolution in the main scanning direction and that in the sub scanning direction at a stage where the picture signal is outputted from the image processing device to an external device. In case that the resolution in the main scanning direction still differs from that in the sub scanning direction when the picture signal is transferred to the external device and the like, this, when displaying an image, for example, by means of the external device such as PC monitors, may result in displaying an image having different sizes in the two scanning directions, respectively, which will be hard to deal with as an image. However, a potential problem as above can be solved by providing the sub scanning resolution converting means.

Moreover, since the sub scanning resolution converting means converts the resolution in the sub scanning direction into that in the main scanning direction prior to a memory of a picture signal in the memory means, when, for example, increasing the resolution in the sub scanning direction so as to convert it into the resolution in the main scanning direction, a quality image in which deterioration of image quality is suppressed can be obtained although a required capacity of the memory means becomes large, thereby obtaining a desirable image in which deterioration of image quality is suppressed.

In this way, the picture signal, which can be converted to an manageable image at the external device and which is transferred to the external device, becomes an image with a desirable quality in which deterioration of image quality is suppressed.

Meanwhile, the image processing device of the present invention may have an arrangement which include:

(a) memory means for storing the picture signal subjected to the image processing; and
(b) sub scanning resolution converting means for converting the resolution in the sub scanning direction into that in the main scanning direction when transferring the picture signal stored in the memory means to an external device.

It is possible in the foregoing structure to align the resolution in the main scanning direction and that in the sub scanning direction at the stage where the picture signal is outputted from the image processing device to an external device. In case that the resolution in the main scanning direction still differs from that in the sub scanning direction when the picture signal is transferred to the external device, this, when displaying an image, for example, by means of the external device such as PC monitors, may result in displaying a image having different sizes in the two scanning directions, respectively, which will be hard to deal with as an image. However, a potential problem as above can be solved by providing the sub scanning resolution converting means.

In addition, since the sub scanning resolution converting means converts the resolution in the sub scanning direction into that in the main scanning direction when transferring the picture signal stored in the memory means to an external device, when, for example, increasing the resolution in the sub scanning direction so as to convert it into the resolution in the main scanning direction, the capacity of the memory means can be minimized despite causing a little deterioration of image quality in an obtained image.

In this way, the image processing device which is capable of converting an image which can be dealt with by an external device with ease, and with which low cost is maintained by further reducing a capacity, can be realized.

Furthermore, the image processing device of the present invention may have an arrangement which include:

(a) memory means for storing the picture signal subjected to the image processing;
(b) pre-memory sub scanning resolution converting means for converting the resolution in the sub scanning direction into that in the main scanning direction with respect to the picture signal yet to be stored in the memory means; and
(c) post-memory sub scanning resolution converting means for converting the resolution in the sub scanning direction into that in the main scanning direction when the picture signal stored in the memory means is transferred to an external device, wherein, either one of the pre-memory sub scanning resolution converting means and the post-memory sub scanning resolution converting means is selected in accordance with a purpose of the image processing.

It is possible in the foregoing structure to select according to the purpose of image processing one of the following two means for aligning the resolution in the sub scanning direction with that in the main scanning direction of the picture signal to be transferred to an external device: pre-memory sub scanning resolution converting means which performs the above processing before the memory means stores the picture signal; and post-memory sub scanning resolution converting means, which performs the above processing in the process of transferring the picture signal to the external device after the memory means have stored the picture signal. For example, when increasing the resolution in the sub scanning direction so as to align it with the resolution in the main scanning direction, converting the resolution in the sub scanning direction before the memory means stores the picture signal can suppress deterioration of image quality in an obtained image although the capacity of the memory device becomes larger. On the other hand, converting the resolution in the sub scanning direction after the memory means stored the picture signal can reduce the capacity of the memory device despite a little deterioration of image quality in the obtained image.

In this way, it is possible to arbitrarily select a processing method in accordance with a purpose, such as suppressing deterioration of image quality of an obtained image, or reducing the capacity of the memory device, etc.

The concrete embodiments and examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image processing device which receives a picture signal which was read out while resolution in a sub scanning direction is converted by changing a speed of reading images, comprising:

region separating means for separating said picture signal into each region in accordance with the converted resolution in the sub scanning direction; and resolution and regional image processing means for performing image processing on said picture signal in accordance with the converted resolution in the sub scanning direction and each region separated by said region separating means.

2. The image processing device as set forth in claim 1, wherein:

said region separating means calculates feature parameters indicative of a characteristic of each pixel in said picture signal and carries out a correction in accordance with the resolution in the sub scanning direction with respect to a resolution dependent feature parameter of the feature parameters, which is dependent on the resolution in the sub scanning direction, so as to separate said picture signal into each region using said feature parameters including the corrected resolution dependent feature parameter.

3. The image processing device as set forth in claim 2, wherein said feature parameters are calculated to be:

a maximum density difference, which is a maximum value of density difference between pixels in a local block made up of an arbitrarily chosen target pixel and a plurality of pixels in the vicinity of the target pixel; and a complexity, which is a smaller value of (a) a sum total of density difference values in a main scanning direction and (b) a sum total of density difference values in the sub scanning direction with respect to each pixel in the local block.

4. The image processing device as set forth in claim 2, wherein said resolution dependent feature parameter is calculated to be:

a complexity which is a smaller value of (a) a sum total of density difference values in a main scanning direction and (b) a sum total of density difference values in the sub scanning direction with respect to each pixel in a local block made up of an arbitrarily chosen target pixel and a plurality of pixels in the vicinity of the target pixel.

5. The image processing device as set forth in claim 3, wherein:

said region separating means includes a region separating look-up table in which a boundary for separating the picture signal into each region is set on a two-dimensional plane having axes of said maximum density difference and said complexity, taking into consideration a relationship between said maximum density difference and said complexity, and each region, and said region separating means separating the picture signal into each region by using said region separating look-up table.

6. The image processing device as set forth in claim 5, wherein:

said region separating means, instead of correcting said complexity in accordance with the resolution in the sub scanning direction, includes a plurality of said region separating look-up tables for adapting to changes in resolution in the sub scanning direction.

7. The image processing device as set forth in claim 5, wherein:

said region separating means, instead of correcting said complexity in accordance with the resolution in the sub scanning direction, corrects said region separating look-up table in accordance with the resolution in the sub scanning direction.

8. The image processing device as set forth in claim 1, wherein:

said resolution and regional image processing means is a filter processing section for selecting a filter factor in accordance with the converted resolution in the sub scanning direction and each region separated by said region separating means, and for performing filter processing with respect to each pixel in the picture signal by using the selected filter factor.

9. The image processing device as set forth in claim 2, wherein:

said resolution and regional image processing means is filter processing means for selecting a filter factor in accordance with the converted resolution in the sub scanning direction and each region separated by said region separating means, and for performing filter processing with respect to each pixel in the picture signal by using the selected filter factor.

10. The image processing device as set forth in claim 1, further comprising:

memory means for storing the picture signal subjected to the image processing; and sub scanning resolution converting means for converting the resolution in the sub scanning direction into the resolution in a main scanning direction with respect to the picture signal yet to be stored in said memory means.

11. The image processing device as set forth in claim 10, wherein:

said sub scanning resolution converting means is a variable magnification-resolution converter section for interpolating pixels in the sub scanning direction when the resolution in the sub scanning direction is lower than the resolution in the main scanning direction, and for thinning out the pixels in the sub scanning direction when the resolution in the sub scanning direction is higher than the resolution in the main scanning direction.

12. The image processing device as set forth in claim 10, wherein:

said sub scanning resolution converting means employs a nearest neighbor method when converting the resolution in the sub scanning direction into the resolution in the main scanning direction.

13. The image processing device as set forth in claim 10, wherein:

said sub scanning resolution converting means employs an n-th interpolation method when converting the resolution in the sub scanning direction into the resolution in the main scanning direction.

14. The image processing device as set forth in claim 1, further comprising:

memory means for storing the picture signal subjected to the image processing; and sub scanning resolution converting means for converting the resolution in the sub scanning direction into resolution in a main scanning direction when transferring the picture signal stored in said memory means to an external device.

15. The image processing device as set forth in claim 14, wherein:

said sub scanning resolution converting means is a resolution converter section which transfers the picture signal to said external device by successively scanning the picture signal in the main scanning direction, and when the resolution in the sub scanning direction is lower than the resolution in the main scanning direction, the resolution converter section scans an image of a certain line for plural times to convert the resolution in the sub scanning direction into the resolution in the main scanning direction.

16. The image processing device as set forth in claim 1, further comprising:

memory means for storing the picture signal subjected to the image processing;

pre-memory sub scanning resolution converting means for converting the resolution in the sub scanning direction into resolution in a main scanning direction with respect to the picture signal yet to be stored in said memory means;

post-memory sub scanning resolution converting means for converting the resolution in the sub scanning direction into the resolution in the main scanning direction when the picture signal stored in said memory means is transferred to an external device, wherein:

either one of said pre-memory sub scanning resolution converting means and said post-memory sub scanning resolution converting means is selected in accordance with a purpose of image processing.

17. The image processing device as set forth in claim 16, wherein:

said pre-memory sub scanning resolution converting means is a variable magnification-resolution converter section which interpolates pixels in the sub scanning direction when the resolution in the sub scanning direction is lower than the resolution in the main scanning direction, and which thins out pixels in the sub scanning direction when the resolution in the sub scanning direction is higher than the resolution in the main scanning direction.

18. The image processing device as set forth in claim 16, wherein:

said post-memory sub scanning resolution converting means is a resolution converter section which transfers the picture signal to said external device by successively scanning the picture signal in the main scanning direction, and when the resolution in the sub scanning direction is lower than the resolution in the main scanning direction, the resolution converter section scans an image of a certain line for plural times to convert the resolution in the sub scanning direction into the resolution in the main scanning direction.

19. An image processing apparatus that receives a picture signal whose resolution in a main scanning direction and resolution in a sub scanning direction are different, the apparatus comprising:

region separating section for separating said picture signal into each region in accordance with the resolution in the sub scanning direction; and resolution and regional image processing section for performing image processing on said picture signal in accordance with the resolution in the sub scanning direction and each region separated by said region separating section.

* * * * *